(12) United States Patent
Wang et al.

(10) Patent No.: US 9,121,519 B2
(45) Date of Patent: Sep. 1, 2015

(54) LOCKING MECHANISM FOR A NOZZLE IN AN INFLATABLE OBJECT

(71) Applicant: Team Worldwide Corporation, Taipei (TW)

(72) Inventors: Cheng-Chung Wang, Taipei (TW); Chien-Hua Wang, Taipei (TW)

(73) Assignee: Team Worldwide Corporation, Taipei (TW)

( * ) Notice: Subject to any disclaimer, the term of this patent is extended or adjusted under 35 U.S.C. 154(b) by 0 days.

(21) Appl. No.: 14/160,486

(22) Filed: Jan. 21, 2014

(65) Prior Publication Data

US 2014/0209185 A1    Jul. 31, 2014

(30) Foreign Application Priority Data

Jan. 25, 2013  (CN) .......................... 2013 1 0030781

(51) Int. Cl.
*F16K 15/20*    (2006.01)

(52) U.S. Cl.
CPC ........... *F16K 15/20* (2013.01); *Y10T 137/3755* (2015.04); *Y10T 137/3771* (2015.04)

(58) Field of Classification Search
CPC ....................................................... B63C 9/24

USPC .......... 137/223, 232, 233, 234; 251/255, 272, 251/349, 353, 82

See application file for complete search history.

(56) References Cited

U.S. PATENT DOCUMENTS

| 2,772,692 A * | 12/1956 | Russell ......................... 137/223 |
| 4,015,622 A * | 4/1977 | Pagani .......................... 137/223 |
| 5,103,857 A * | 4/1992 | Kuhn et al. ............... 137/315.13 |
| 7,066,442 B2 * | 6/2006 | Rose ......................... 251/149.8 |
| 7,497,416 B2 * | 3/2009 | Wang ........................... 251/349 |

\* cited by examiner

*Primary Examiner* — Kevin Murphy
*Assistant Examiner* — R. K. Arundale

(57) ABSTRACT

A locking mechanism for a nozzle in an inflatable object includes a membrane member having a ledge extending outward for securely engaging with the inflatable object, a nozzle seat having a flange to firmly engage with the ledge, a positioning element having two arms, a cap having a lifting mechanism to elevate location of the positioning element, a descending mechanism to descend the location of the positioning element and a sealing part integrally formed and a sealing part integrally extending from the flange and a core having a directing rod securely connected to the positioning element so as to move with the positioning element accordingly and a sealing flange formed with the directing rod such that movement of the core together with the positioning element allows the sealing flange to selectively and sealingly engage with the sealing part of the nozzle seat to block airflow.

16 Claims, 8 Drawing Sheets

LOCKING MECHANISM FOR A NOZZLE IN AN INFLATABLE OBJECT

CROSS-REFERENCE TO RELATED APPLICATION

This application claims priority and benefit of Chinese patent application, CN 103104725A, filed on Jan. 15, 2013. The content thereof is herein incorporated by reference.

FIELD OF THE INVENTION

The preferred embodiment of the invention is related to a locking mechanism, and more particularly, to a locking mechanism for nozzle in an inflatable object.

BACKGROUND OF THE INVENTION

An inflatable object has many applications. People use it in normal daily lives, such as, in leisure times or in special circumstances. Despite all the applications and variety of functions, all the users of the inflatable device want the inflatable device to be durable and strong. To meet the requirements, numerous designs applied to the inflatable device have been developed to prolong the life span of the inflatable device.

With all the readily available designs to prolong the lifespan of the inflatable devices, one major problem for the inflatable device is that the air must pass a nozzle device to go into the inflatable object and the quality of the nozzle device direct affects the operation of the inflatable object. That is, should the sealing effect of the nozzle device to the inflatable object be defected, user's confidence to the object is lost.

Currently, the sealing effect is achieved by a check-valve related device to seal the nozzle. In order to completely seal the nozzle and to prolong the inflated status of the inflatable object, a sealing cap is either directly inserted or threadingly inserted into the nozzle, which inevitably increase the manufacture cost and brings inconvenience to the operator. On the other hand, when the air inside the inflatable object is required to escape, an additional accessory, such as a rod or even a finger, is needed to help release the air. With the assistance of the additional rod or finger to escape the air inside the inflatable object is both troublesome to the operator and the lifespan of the nozzle is shortened.

SUMMARY OF THE INVENTION

The primary objective of the present invention is to provide a locking mechanism for a nozzle in an inflatable object. The locking mechanism includes a membrane member having a ledge extending outward for securely engaging with the inflatable object, a nozzle seat having a flange formed to engage with a face of the ledge of the membrane member and a sealing part integrally extending from the flange, a positioning element movably received at least partially inside the nozzle seat and having at least one arm extending outward, a cap rotatably connected to a portion of the nozzle seat and having a lifting mechanism to elevate location of the positioning element, a descending mechanism to descend the location of the positioning element and a core received inside the nozzle seat and having a directing rod extending in a first direction and connected to the positioning element so as to move with the positioning element accordingly and a sealing flange formed with the directing rod such that movement of the core together with the positioning element allows the sealing flange to selectively engage with the sealing part of the nozzle seat to block airflow.

Another objective of the embodiment of the present invention is that the cap has a passage for airflow to flow into and escape from the inflatable object.

Another objective of the embodiment of the present invention is the cap has a holding part, a neck axially extending from an inner face of the cap and a cavity defined between the holding part and the neck, the nozzle seat has a collar integrally and axially extending in a first direction from the flange to securely fit into the cavity of the cap so as to engage the nozzle seat with the cap.

Another objective of the embodiment of the present invention is the lifting mechanism of the cap is composed of a first inclined face to lift the arms of the positioning element and a first locking face formed with the first inclined face to sustain the positioning element in an elevated position.

Another objective of the embodiment of the present invention is the descending mechanism of the cap is composed of a second inclined face to descend the arm of the positioning element and a second locking face formed with the second inclined face to sustain the positioning element in a descended position.

Another objective of the embodiment of the present invention is the positioning element together with the core is maintained at the descended position by the second locking face of the descending mechanism such that the sealing flange is separated from engagement with the sealing part of the nozzle seat to allow airflow inside the inflatable object to escape when deflation to the inflatable object is necessary.

Another objective of the embodiment of the present invention is that a recovery element is mounted around the directing rod of the core to provide resilience force when compressed.

Another objective of the embodiment of the present invention is that the at least one arm of the positioning element is positioned between a free space between the lifting mechanism and a lower portion of the cap such that the recovery element biases the sealing flange to be engaged with the sealing part by the recovery element to prevent airflow inside the inflatable object to escape, whereby when inflation to the inflatable object is necessary, compressed air from the cap overcomes the resilience of the recovery element and forces the positioning element to the descended position such that the sealing flange is separated from engagement with the sealing part of the nozzle seat to allow airflow to flow inside the inflatable object.

Another objective of the embodiment of the present invention is the directing rod has a slit defined in a free end thereof and an engaging hook formed on the free end of the directing rod and the positioning element has a hole so that the engaging hook is able to deform when passing through the hole of the positioning element and securely engage with a side face defining the hole of the positioning element to secure engagement between the positioning element and the core.

DETAILED DESCRIPTION OF THE INVENTION

The following description is merely exemplary in nature and is in no way intended to limit the present teachings, applications, or uses. Those of skill in the art will recognize that the following description is merely illustrative of the principles of the invention, which may be applied in various ways to provide many different alternative embodiments.

Figure 1:
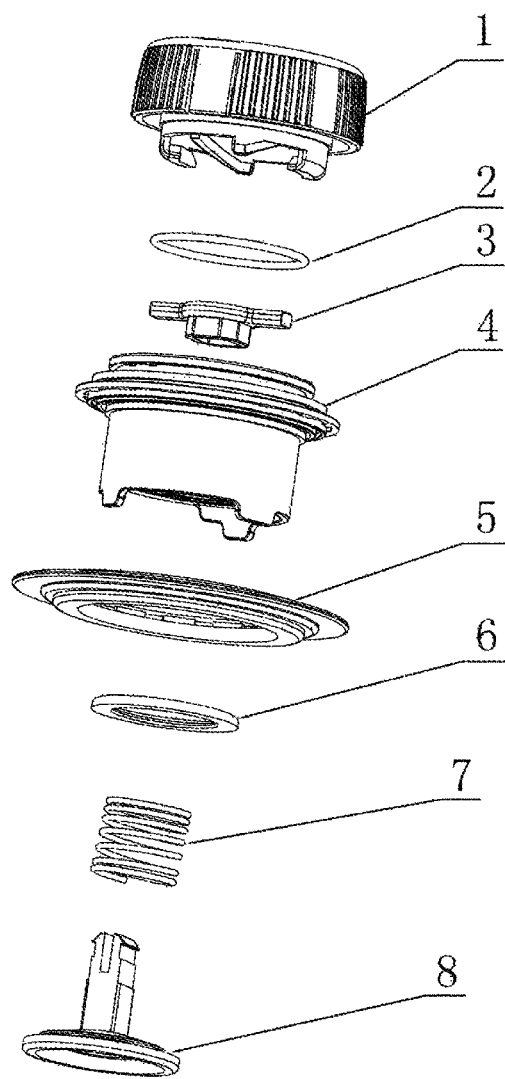
FIG. 1 is an exploded perspective view of a locking mechanism of a preferred embodiment of the present invention.
Figure 2:
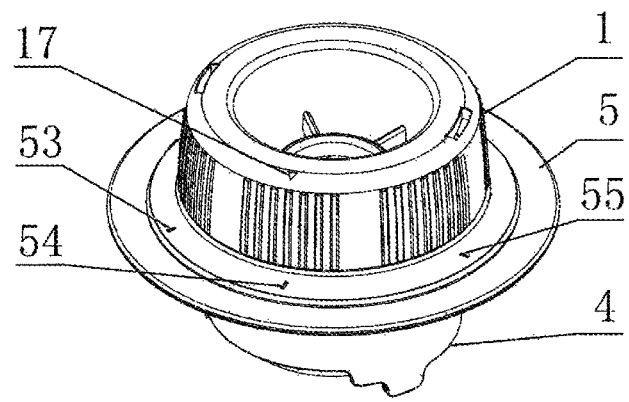
FIG. 2 is a perspective view showing the assembled locking mechanism of the preferred embodiment of the present invention.

With reference to FIGS. 1 and 2, a locking mechanism constructed in accordance with the preferred embodiment of the present invention is used for a nozzle in an inflatable object has a cap 1, a sealing ring 2, a positioning element 3, a nozzle seat 4, a membrane member 5, an airtight ring 6, a recovery element 7 and a core 8.

Figure 3:
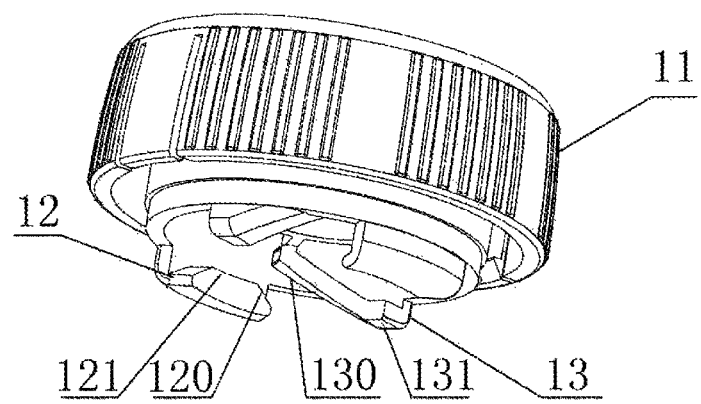
FIG. 3 is a perspective view of the cap of the preferred embodiment of the present invention.
Figure 4:
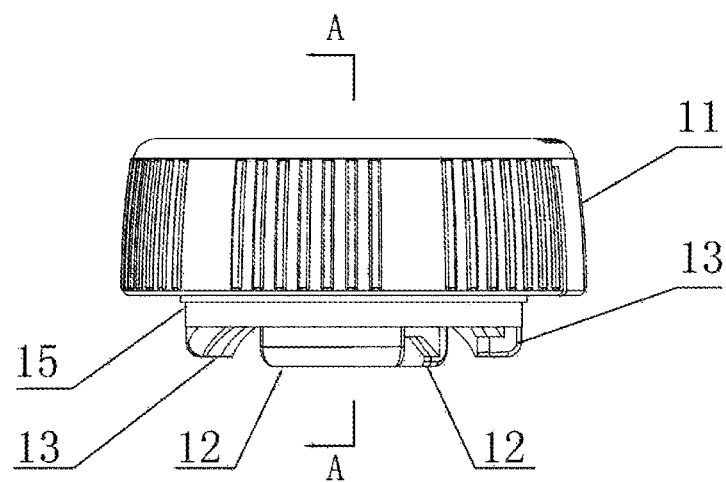
FIG. 4 is a side plan view of the cap shown in FIG. 3.
Figure 5:
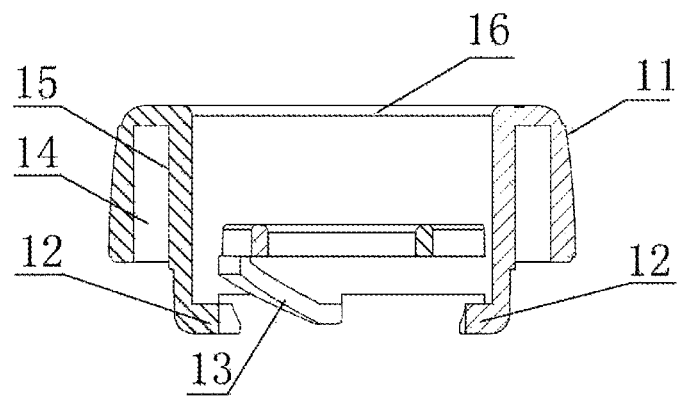
FIG. 5 is a cross sectional view of the cap shown by line A-A in FIG. 4.
Figure 6:
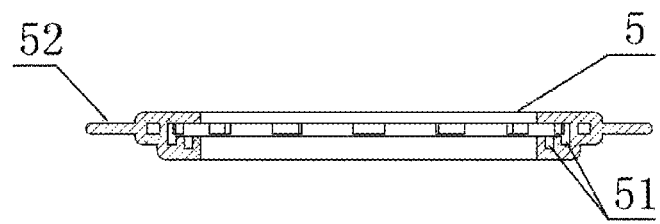
FIG. 6 is a cross sectional view of a membrane member of the preferred embodiment of the present invention.
Figure 7:
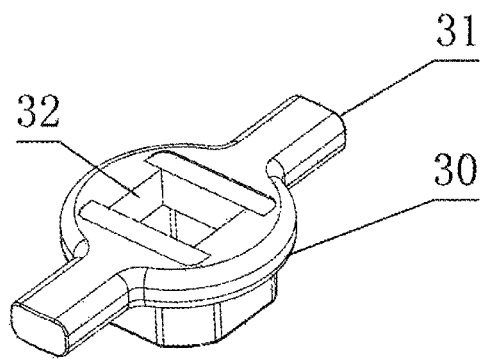
FIG. 7 is a perspective view of a positioning element of the preferred embodiment of the present invention.
Figure 8:
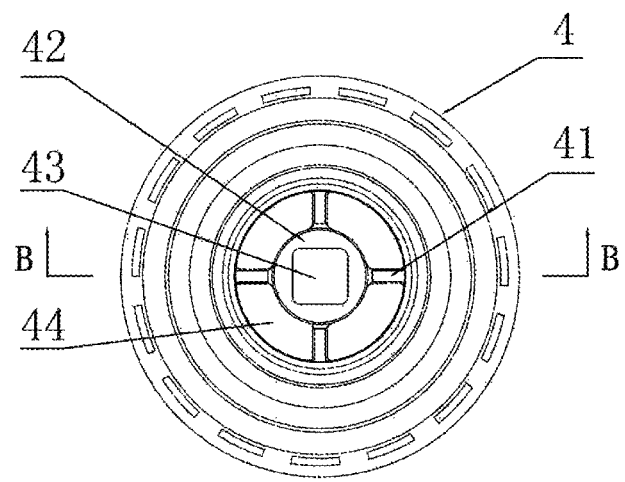
FIG. 8 is an end view of the nozzle seat of the preferred embodiment of the present invention.
Figure 9:
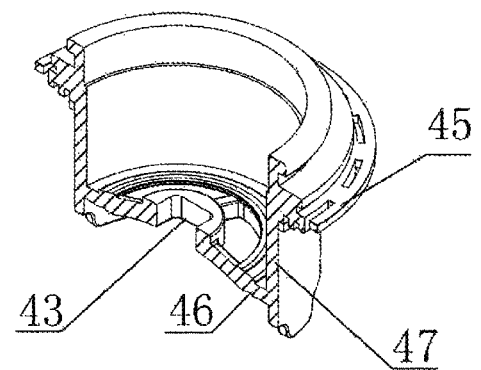
FIG. 9 is a partial exploded perspective view of the nozzle seat shown by line B-B in FIG. 8.

With reference to FIGS. 3, 4 and 5, it is noted that the cap 1 is provided with a holding part 11, preferably threaded on the outer periphery thereof for easy holding, a neck 15 axially, for example, downward from an inner face of the holding part 11, a cavity 14 defined between an inner face of the neck 15 and an inner face of the holding part 11, a centrally defined passage 16 through the entire cap 1, a limiting element 12 integrally formed on a bottom end of the neck 15 and having a first inclined face 120 formed on a side face of the limiting element 12 and a first locking face 121 formed on top of the first inclined face 120, a driving element 13 integrally formed on the bottom end of the neck 15 and spaced apart from the limiting element 12. The driving element 13 has a second inclined face 130 formed on a side face of the driving element 13 and a second locking face 131 formed on top of the second inclined face 130. Integrally, the limiting element 12 and the driving element 13 may be called a limiting mechanism.

With reference to FIGS. 6, 7 8 and 9, it is noted that the positioning element 3 is equipped with a body 30, two arms 31, preferably, horizontally stretching out from two opposed directions of the body 30 to selectively interact with either the limiting element 12 or the driving element 13 and a hole 32 defined through the body 30 of the positioning element 3.

The nozzle seat 4 has a channel 44, a deflector 42 formed on a periphery defining the channel 44 with the assistance of ribs 41 integrally extending toward an inner periphery defining the channel 44, a directing hole 43 defined through the deflector 42, an annular flange 45 extending out from the nozzle seat 4 and having multiple bosses 451 integrally formed on a face of the flange 45, a sealing part 46 formed on an outer periphery of the channel 44 and a collar 47, preferably, axially extending together with the sealing part 46 upward to be fitted into the cavity 14 of the cap 1.

The membrane member 5 is to sealingly fit with the flange 45 of the nozzle seat 4 and has a ledge 52 annularly formed with the membrane member 5 for sealingly engaging with the inflatable object and rooms 51 defined in a face of the membrane member 5 to accommodate the bosses 451 of the flange 45 of the nozzle seat 4.

Figure 10:
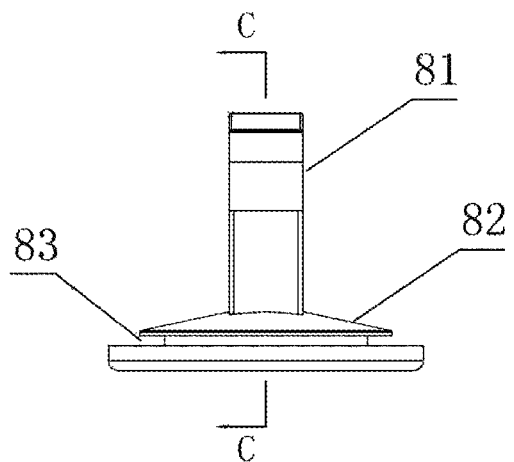
FIG. 10 is a side plan view of a core of the preferred embodiment of the present invention.
Figure 11:
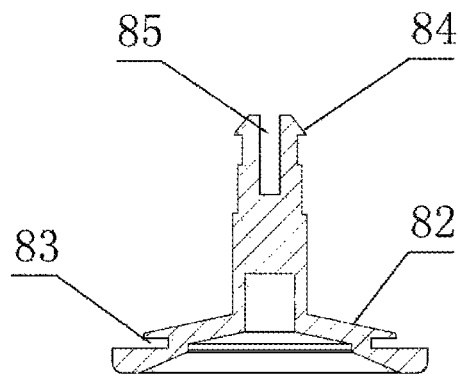
FIG. 11 is a cross sectional view of the core shown in FIG. 10 by line C-C.
Figure 12:
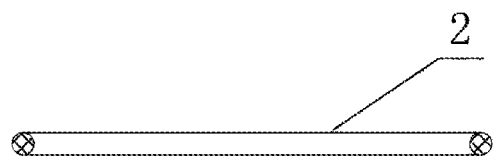
FIG. 12 is a cross sectional view of a sealing ring used by the cap.
Figure 13:
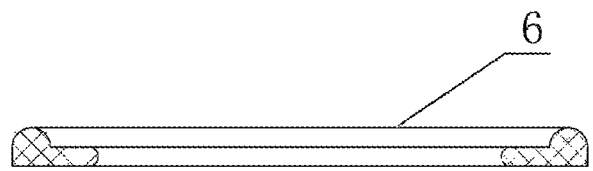
FIG. 13 is a cross sectional view of a sealing member of the preferred embodiment of the present invention.

With reference to FIGS. 10 and 11, the core 8 has a directing rod 81 to be inserted into the hole 32 of the positioning element 3, a sealing flange 82 formed on a distal end of the directing rod 81 to be sealingly engaged with the sealing part 46 of the nozzle seat 4 and a positioning space 83 annularly defined in the sealing flange 82 to receive therein the sealing ring 6. The directing rod 81 has an engaging hook 84 formed on the other distal end thereof in contrast to the sealing flange 82 and a slit 85 extending from a free end of the directing rod 81 to a certain depth to allow the engaging hook 84 to deform when necessary.

When the locking mechanism of the preferred embodiment of the present invention is in assembly, it is noted that the airtight ring 6 is received in the positioning space 83 of the core 8 and the sealing ring 2 is received in the collar 47 of the nozzle seat 4 so that after the collar 47 is extended into the cavity 14 of the cap 1, the sealing ring 2 ensures that the engagement between the cap 1 and the nozzle seat 4 is airtight. Before an airtight engagement between the ledge 52 of the membrane member 5 and the flange 45 of the nozzle seat 4, the positioning element 3 is movably received between the limiting element 12 and the driving element 13 of the cap 1. After the recovery element 7, preferably a spring, is mounted around the directing rod 81, the directing rod 81 is extended into the hole 32 of the positioning element 3 and the engaging hook 84 securely engages a periphery defining the hole 32 to avoid separation between the positioning element 3 and the core 8. While the directing rod 81 is extending into the hole 32, the slit 85 allows the engaging hook 84 to deform to allow the engaging hook 84 to smoothly pass the barrier formed by the size of the hole 32. After the directing rod 81 passes the hole, the resilience caused by the slit 85 forces the engaging hook 84 to snap back to its original position to securely engage with the periphery defining the hole 32. Thereafter, the airtight ring 6 is securely received in the positioning space 83 of the core 8 to ensure the engagement between the sealing flange 82 and the sealing part 46 of the nozzle seat 4 is airtight, if necessary.

It is to be noted that the cap 1 is movable among three different positions, namely, inflating position 53, airtight position 54 and deflating position 55 respectively indicated on a face of the ledge 52 of the membrane member 5. When the cap 1 is positioned at the airtight position 54, the limiting mechanism forces the core 8 to sealingly engage with the sealing part 46 of the nozzle seat 4 as a result of the sealing effect of the airtight ring 6 to a side face of the sealing part 46. When the cap 1 is positioned at the inflating position 53, the core 8 is movable to allow air to flow freely in only one direction and when the cap 1 is positioned at the deflating position 55, the core 8 is positioned in such a way that the air inside the inflatable object 9 can only escape from the inflatable object 9.

Figure 14:
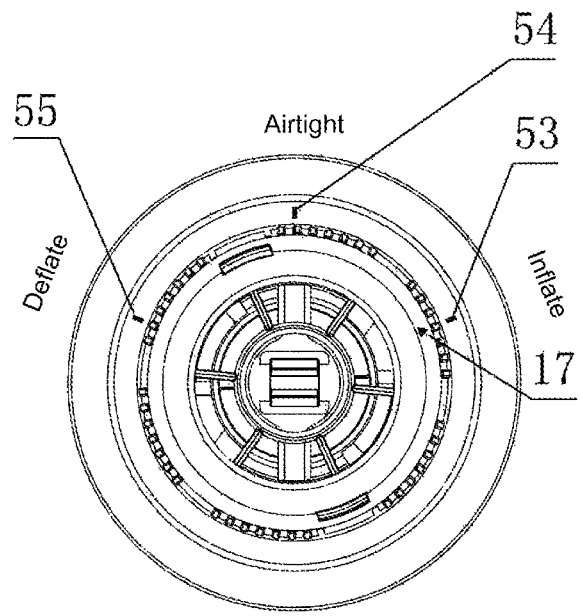
FIG. 14 is a top plan view showing the inflating status of the locking mechanism of the preferred embodiment of the present invention.
Figure 15:
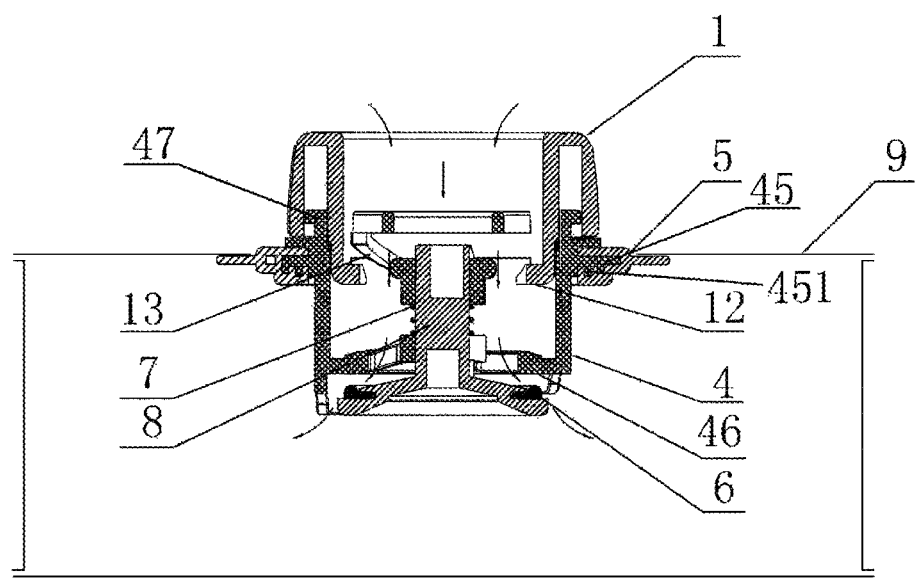
FIG. 15 is a schematic cross sectional view showing the inflating status of the locking mechanism of the preferred embodiment of the present invention shown in FIG. 14.

With reference to FIGS. 14 and 15, when the inflatable object is required to be inflated and the cap 1 is rotated to allow an indicator 17 formed on a face of the cap 1 to be aligned with the inflating position 53, the two arms 31 are positioned between a free space between the limiting element 12 and the neck 15 at a lower portion of the cap 1, which allows the positioning element 3 to move freely without engagement from the limiting mechanism (limiting element 12 and driving element 13). Under such a circumstance, the compressed air coming from the passage 16 of the cap 1 overcomes the resilience of the recovery element 7 and forces the core 8 together with the positioning element 3 moving downward to disengage the engagement between the sealing part 46 of the nozzle seat 4 and the airtight ring 6 that is securely received in the positioning space 82 of the core 8. Thus the compressed air is freely flowing into the inflatable object 9 until the inflatable object 9 is fully inflated. At the point when the inflatable object 9 is fully inflated, the compressed air stops flowing into the inflatable object 9. As there is no other force overcoming the resilience of the recovery element 7, the resilience of the recovery element 7 pushes the core 8 upward to allow the airtight ring 6 to once again engage with the sealing part 46 of the nozzle seat 4 in an airtight manner to avoid any leak.

Figure 16:
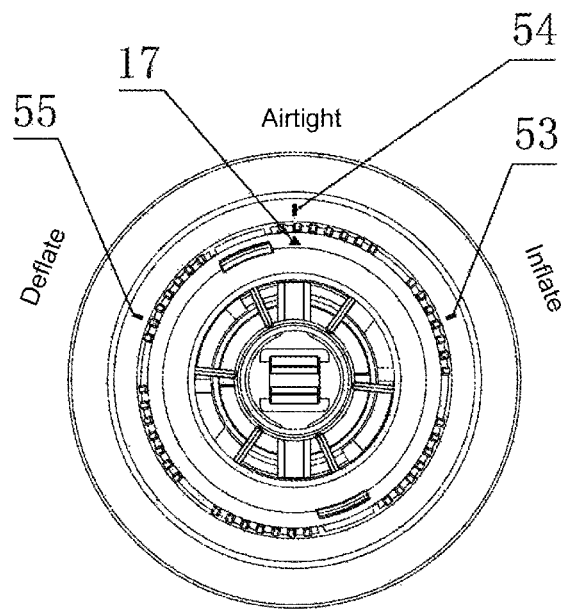
FIG. 16 is a top plan view showing the sealing status of the locking mechanism of the preferred embodiment of the present invention.
Figure 17:
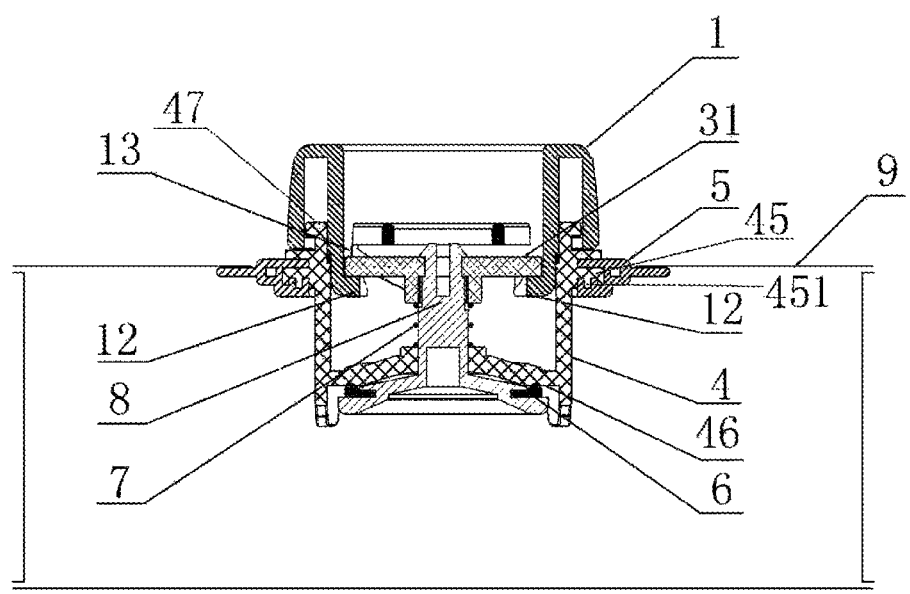
FIG. 17 is a schematic cross sectional view showing the sealing status of the locking mechanism of the preferred embodiment of the present invention.

With reference to FIGS. 16 and 17, after the inflatable object is fully inflated and the resilience of the recovery element 7 pushes the core 8 together with the positioning element 3 upward to allow the airtight ring 6 to engage with the sealing part 46 of the nozzle seat 4, the cap 1 is rotated to align the indicator 17 on the cap 1 with the airtight position 54 on the membrane member 5. While the cap 1 is rotated toward the airtight position 54, the first inclined face 120 of the limiting element 12 force (lift) the arm 31 together with the core 8 to move upward allowing the engagement between the airtight ring 6 and the sealing part 46 of the nozzle seat 4 to become tighter. Continuing rotating the cap 1 allows the arm 31 to eventually rest on the first locking face 121. Under such a situation, the airtight engagement between the airtight ring 6 and the sealing part 46 of the nozzle seat 4 remains.

Figure 18:
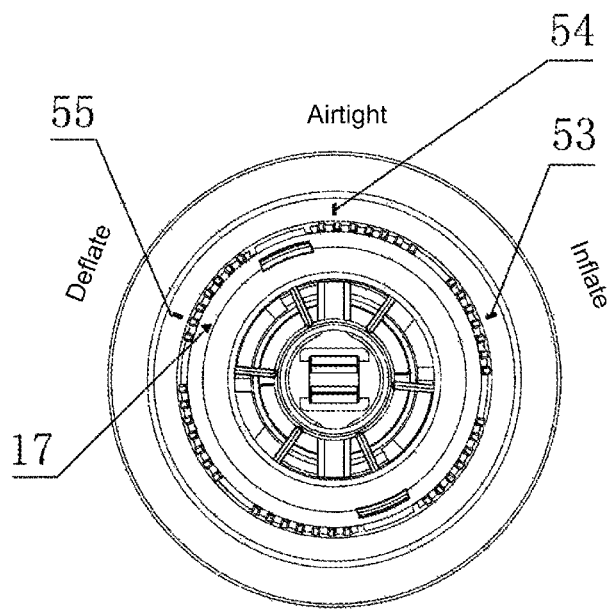
FIG. 18 is a top plan view showing the deflating status of the locking mechanism of the preferred embodiment of the present invention.
Figure 19:
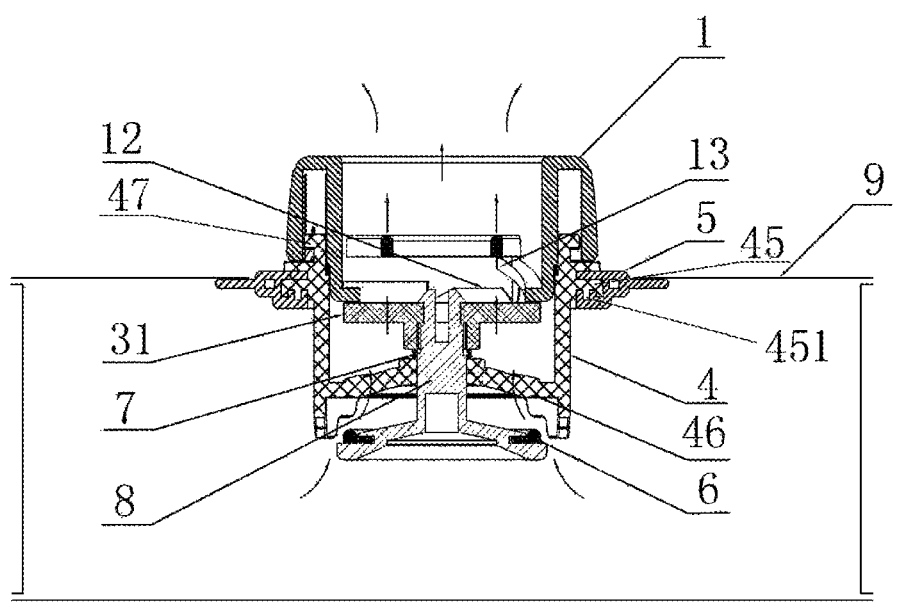
FIG. 19 is a schematic cross sectional view showing the deflating status of the locking mechanism of the preferred embodiment of the present invention.

With reference to FIGS. 18 and 19, when deflating the inflatable object 9 is necessary, the indicator 17 on the cap 1 is moved to align with the deflating position 55. While the cap 1 is rotated, the arms 31 are depressed by the second inclined face 130 of the driving element 13. As the core 8 is securely connected to the positioning element 3, the core 8 is accordingly descended. When the arms 31 are continuously depressed and moved downward in the same time, continuing rotating the cap 1 forces the arms 31 to move to a side face of the second locking face 131 of the driving element 13 formed on the cap 1. In the meantime, while the core 8 and the positioning element 3 are moved downward, the recovery element 7 is also compressed by the body 30. As a result of the fact that the recovery element 7 is compressed, the recovery force stored in the compressed spring 7 pushes upward the positioning element 3 to secure the engagement between the positioning element 3 and the second locking face 131 of the driving element 13. While the positioning element 3 is kept upward, as is the core 8, the airtight ring 6 is separated from engagement of the sealing part 46 of the nozzle sear 4 such that the air inside the inflatable object 9 is able to escape from the passage 16 to accomplish the goal of deflation.

It is to be noted that although the preferred embodiment of the present invention has been described, other modifications, alterations or minor change to the structure should still be within the scope defined in the claims. As those skilled in the art will readily observe that numerous modifications and alterations of the device and method may be made while retaining the teachings of the invention.

What is claimed is:

1. A locking mechanism for a nozzle in an inflatable object, the locking mechanism comprising:
   a membrane member having a ledge extending outward for securely engaging with the inflatable object;
   a nozzle seat having a flange formed to engage with a face of the ledge of the membrane member and a sealing part integrally extending from the flange
   a positioning element movably received at least partially inside the nozzle seat and having at least one arm extending outward;
   a cap rotatably connected to a portion of the nozzle sea, the cap and having a lifting mechanism to elevate a location of the positioning element and a descending mechanism to descend the location of the positioning element; and
   a core received inside the nozzle seat, the core having a directing rod extending in a first direction and connected to the positioning element so as to move with the positioning element accordingly and a sealing flange formed with the directing rod such that movement of the core together with the positioning element allows the sealing flange to selectively engage with the sealing part of the nozzle seat to block airflow;
   wherein the cap has a passage for airflow to flow into and escape from the inflatable object, a holding part, a neck axially extending from an inner face of the cap and a cavity defined between the holding part and the neck, and wherein the nozzle seat has a collar integrally and axially extending in a first direction from the flange to securely fit into the cavity of the cap so as to engage the nozzle seat with the cap.

2. The locking mechanism as claimed in claim 1, wherein the lifting mechanism of the cap is composed of a first inclined face to lift the arm(s) of the positioning element and a first locking face formed with the first inclined face to sustain the positioning element in an elevated position.

3. The locking mechanism as claimed in claim 2, wherein the descending mechanism of the cap is composed of a second inclined face to descend the arm(s) of the positioning element and a second locking face formed with the second inclined face to sustain the positioning element in a descended position.

4. The locking mechanism as claimed in claim 3, wherein the positioning element together with the core is maintained at the descended position by the second locking face of the descending mechanism such that the sealing flange is separated from engagement with the sealing part of the nozzle seat to allow airflow inside the inflatable object to escape when deflation to the inflatable object is necessary.

5. The locking mechanism as claimed in claim 4 further comprising a recovery element mounted around the directing rod of the core to provide resilience force when compressed.

6. The locking mechanism as claimed in claim 5, wherein the at least one arm of the positioning element is positioned between a free space between the lifting mechanism and a lower portion of the cap such that the recovery element biases the sealing flange to be engaged with the sealing part by the recovery element to prevent airflow inside the inflatable object to escape, whereby when inflation to the inflatable object is necessary, compressed air from the cap overcomes the resilience of the recovery element and forces the positioning element to the descended position such that the sealing flange is separated from engagement with the sealing part of the nozzle seat to allow airflow to flow inside the inflatable object.

7. The locking mechanism as claimed in claim 5, wherein the directing rod has a slit defined in a free end thereof and an engaging hook formed on the free end of the directing rod and the positioning element has a hole so that the engaging hook is able to deform when passing through the hole of the positioning element and securely engage with a side face defining the hole of the positioning element to secure engagement between the positioning element and the core.

8. The locking mechanism as claimed in claim 3 further comprising a recovery element mounted around the directing rod of the core to provide resilience force when compressed.

9. The locking mechanism as claimed in claim 8, wherein the directing rod has a slit defined in a free end thereof and an engaging hook formed on the free end of the directing rod and the positioning element has a hole so that the engaging hook is able to deform when passing through the hole of the positioning element and securely engage with a side face defining the hole of the positioning element to secure engagement between the positioning element and the core.

10. The locking mechanism as claimed in claim 1 further comprising a recovery element mounted around the directing rod of the core to provide resilience force when compressed.

11. A locking mechanism for a nozzle in an inflatable object, the locking mechanism comprising:
   a membrane member having a ledge extending outward for securely engaging with the inflatable object;
   a nozzle seat having a flange formed to engage with a face of the ledge of the membrane member and a sealing part integrally extending from the flange
   a positioning element movably received at least partially inside the nozzle seat and having at least one arm extending outward;
   a cap rotatably connected to a portion of the nozzle seat, the cap and having a lifting mechanism to elevate a location of the positioning element and a descending mechanism to descend the location of the positioning element; and
   a core received inside the nozzle seat, the core having a directing rod extending in a first direction and connected to the positioning element so as to move with the positioning element accordingly and a sealing flange formed with the directing rod such that movement of the core together with the positioning element allows the sealing flange to selectively engage with the sealing part of the nozzle seat to block airflow;
   wherein the lifting mechanism of the cap is composed of a first inclined face to lift the arm(s) of the positioning element and a first locking face formed with the first inclined face to sustain the positioning element in an elevated position.

12. The locking mechanism as claimed in claim 11, wherein the descending mechanism of the cap is composed of a second inclined face to descend the arm(s) of the positioning element and a second locking face formed with the second inclined face to sustain the positioning element in a descended position.

13. The locking mechanism as claimed in claim 12 further comprising a recovery element mounted around the directing rod of the core to provide resilience force when compressed.

14. The locking mechanism as claimed in claim 11, wherein the positioning element together with the core is maintained at the elevated position by the first locking face of the lifting mechanism such that the sealing flange is engaged with the sealing part of the nozzle seat to block airflow inside the inflatable object from escaping.

15. A locking mechanism for a nozzle in an inflatable object, the locking mechanism comprising:
   a membrane member having a ledge extending outward for securely engaging with the inflatable object;
   a nozzle seat having a flange formed to engage with a face of the ledge of the membrane member and a sealing part integrally extending from the flange
   a positioning element movably received at least partially inside the nozzle seat and having at least one arm extending outward;
   a cap rotatably connected to a portion of the nozzle sea, the cap and having a lifting mechanism to elevate a location of the positioning element and a descending mechanism to descend the location of the positioning element; and
   a core received inside the nozzle seat, the core having a directing rod extending in a first direction and connected to the positioning element so as to move with the positioning element accordingly and a sealing flange formed with the directing rod such that movement of the core together with the positioning element allows the sealing flange to selectively engage with the sealing part of the nozzle seat to block airflow;
   wherein the descending mechanism of the cap is composed of a first inclined face to descend the arm(s) of the positioning element and a first locking face formed with the first inclined face to sustain the positioning element in a descended position.

16. A locking mechanism for a nozzle in an inflatable object, the locking mechanism comprising:
   a membrane member having a ledge extending outward for securely engaging with the inflatable object;
   a nozzle seat having a flange formed to engage with a face of the ledge of the membrane member and a sealing part integrally extending from the flange a positioning element movably received at least partially inside the nozzle seat and having at least one arm extending outward;
   a cap rotatably connected to a portion of the nozzle sea, the cap and having a lifting mechanism to elevate a location of the positioning element and a descending mechanism to descend the location of the positioning element; and
   a core received inside the nozzle seat, the core having a directing rod extending in a first direction and connected to the positioning element so as to move with the positioning element accordingly and a sealing flange formed with the directing rod such that movement of the core together with the positioning element allows the sealing flange to selectively engage with the sealing part of the nozzle seat to block airflow;
   wherein the cap does not elevate or descend when rotated to elevate or descend the positioning element.

* * * * *